US009886222B2

(12) United States Patent
Sato et al.

(10) Patent No.: US 9,886,222 B2
(45) Date of Patent: Feb. 6, 2018

(54) IMAGE FORMING APPARATUS THAT DISPLAYS BUTTON FOR ACCESSING SERVER, METHOD OF CONTROLLING THE SAME, AND STORAGE MEDIUM

(71) Applicant: CANON KABUSHIKI KAISHA, Tokyo (JP)

(72) Inventors: Masaaki Sato, Yokohama (JP); Shiro Kunori, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 52 days.

(21) Appl. No.: 14/328,812

(22) Filed: Jul. 11, 2014

(65) Prior Publication Data
US 2015/0029533 A1     Jan. 29, 2015

(30) Foreign Application Priority Data
Jul. 29, 2013    (JP) ................................. 2013-156645

(51) Int. Cl.
*G06K 15/00*     (2006.01)
*G06F 3/14*     (2006.01)
(Continued)

(52) U.S. Cl.
CPC .......... *G06F 3/1238* (2013.01); *G06F 3/1222* (2013.01); *G06F 3/1278* (2013.01);
(Continued)

(58) Field of Classification Search
CPC ..... H04L 67/02; H04L 67/04; H04L 67/2852; H04L 67/306; H04L 67/303; H04L 37/2852; H04L 63/08; H04L 19/32; H04L 9/3213; H04N 1/00244; H04N 1/00204; H04N 1/0035; H04N 1/00464; H04N 1/00474; H04N 1/00501; H04N 1/00503;
(Continued)

(56) References Cited

U.S. PATENT DOCUMENTS 8,521,857 B2 *   8/2013   Maxwell ................. G06F 3/147
                                                         709/203
8,612,889 B2 * 12/2013   Ookuma ............. G06F 3/04817
                                                         715/810
(Continued)

OTHER PUBLICATIONS

E. Hammer-Lahav, "The OAuth 1.0 Protocol", Internet Engineering Task Force, Apr. 2010, pp. 1-38.
(Continued)

*Primary Examiner* — Chad Dickerson
(74) *Attorney, Agent, or Firm* — Carter, DeLuca, Farrell & Schmidt, LLP

(57) ABSTRACT

An image forming apparatus that makes it possible to easily create an access button on a Web browser, for accessing a server from the image forming apparatus. The image forming apparatus is capable of communicating with the server via a network. The image forming apparatus requests the server to perform authentication of the image forming apparatus, and receives a result of the authentication from the server. When the received result of the authentication indicates success, favorite information including a URL of the server is registered. A button for accessing the server is displayed based on the favorite information.

9 Claims, 16 Drawing Sheets

(51) Int. Cl.
*G06F 3/12* (2006.01)
*H04L 29/06* (2006.01)
*H04N 1/00* (2006.01)
*G06F 17/30* (2006.01)
*G06F 3/00* (2006.01)

(52) U.S. Cl.
CPC ...... *G06F 3/1287* (2013.01); *G06F 17/30884* (2013.01); *H04L 63/08* (2013.01); *H04N 1/0035* (2013.01)

(58) Field of Classification Search
CPC .......... H04N 1/00506; H04N 1/00509; H04N 1/00517; H04N 1/00437; H04N 21/8166; H04N 21/8173; H04N 21/8186; H04N 1/437; G06F 3/04817; G06F 3/1204; G06F 3/1288; G06F 3/1209; G06F 21/41; G06F 21/335; G06F 21/33; G06F 3/1238; G06F 3/1222; G06F 3/1201; G06F 3/1278; G06F 3/1285–3/1287; G06F 17/30884; G06F 17/30887
USPC .... 358/1.13, 1.14, 1.15, 305, 1.11–1.18, 1.9, 358/2.1; 715/749, 763, 764, 765, 846, 715/847, 700, 735, 741, 744, 745
See application file for complete search history.

(56) References Cited

U.S. PATENT DOCUMENTS

| | | | | |
|---|---|---|---|---|
| 8,867,070 | B2* | 10/2014 | Jazayeri | G06F 3/1204 358/1.14 |
| 2012/0047450 | A1* | 2/2012 | Sato | G06F 21/31 715/760 |
| 2012/0110066 | A1* | 5/2012 | Furuta | G06F 3/122 709/203 |
| 2012/0206757 | A1* | 8/2012 | Kawabata | H04L 67/02 358/1.14 |
| 2013/0050733 | A1* | 2/2013 | Kuroda | G06K 15/005 358/1.13 |
| 2013/0242334 | A1* | 9/2013 | Ichida | G06F 3/1222 358/1.14 |
| 2014/0373103 | A1* | 12/2014 | Hirata | G06F 21/31 726/4 |

OTHER PUBLICATIONS

D. Hardt, "The OAuth 2.0 Authorization Framework draft-ietf-oauth-v2-31", OAuth Working Group, Jul. 31, 2012, pp. 1-72.

* cited by examiner

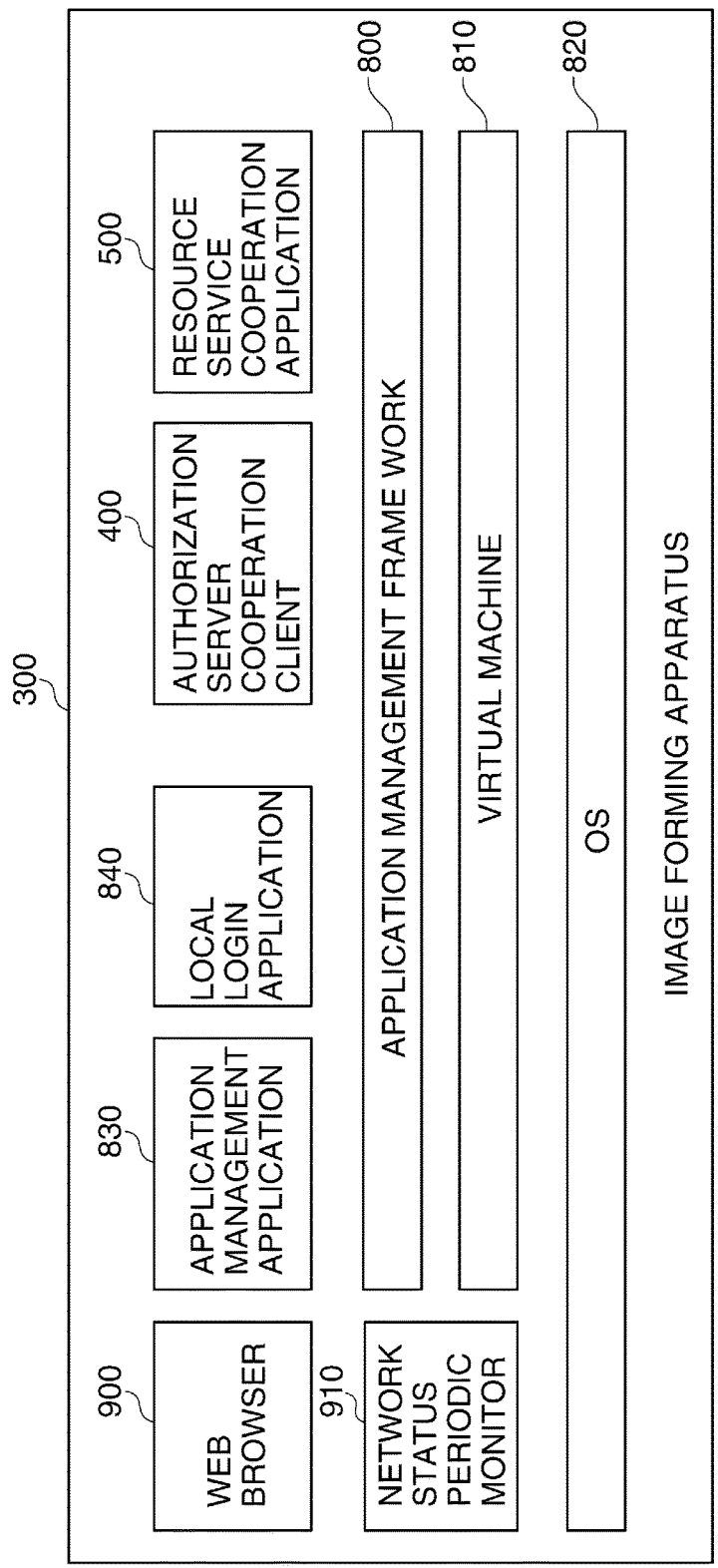

FIG. 4A

DEVICE USER MANAGEMENT TABLE 1500

| USER ID 1501 | PASSWORD 1502 | IC CARD INFORMATION 1503 |
|---|---|---|
| user001 | ******** | ****** |
| user002 | ******** | ****** |

FIG. 4B

DEVICE MANAGEMENT TABLE 1600

| CLIENT ID 1601 | CLIENT SECRET 1602 | END POINT URL 1603 | CLIENT NAME 1605 | CLIENT DESCRIPTION 1606 | REDIRECT URL 1607 | ACCESS URL 1608 |
|---|---|---|---|---|---|---|
| dev00000001 | **************** | https://authz/oauth | PRINTER MODEL: PrinterA | PRINTER NAME: MyPrinterA INSTALLATION LOCATION: Room111 | https://127.0.0.1/redirect/device | URL https://127.0.0.1/NinkaServer/ FAVORITE NAME: AUTHORIZATION SERVER COOPERATION |

FIG. 5A

PARENT TOKEN MANAGEMENT TABLE 1700

| USER ID 1701 | AUTHORIZED TOKEN ID 1702 | REFRESH TOKEN ID 1703 |
|---|---|---|
| user001 | AT_000001 | RT_000001 |
| user002 | AT_000003 | RT_000002 |

FIG. 5B

WEB BROWSER FAVORITE MANAGEMENT TABLE 1900

| FAVORITE NAME 1901 | URL 1902 | REGISTERED APPLICATION 1903 | ENABLE/DISABLE FLAG 1904 |
|---|---|---|---|
| AUTHORIZATION COOPERATION | https://127.0.0.1/NinkaServer/ | AUTHORIZATION SERVER COOPERATION CLIENT | ENABLE/DISABLE |

FIG. 8A

| USER MANAGEMENT TABLE 1300 ||| 
|---|---|---|
| USER ID 1301 | PASSWORD 1302 | USER TYPE 1303 |
| uid00000001 | ********* | USER |
| dev00000001 | *************** | CLIENT |
| uid00000002 | ******** | USER |
| | | |

*FIG. 8B*

CLIENT MANAGEMENT TABLE 1400

| CLIENT ID 1401 | CLIENT NAME 1402 | CLIENT DESCRIPTION 1403 | REDIRECT URL 1404 | SERIAL NUMBER 1405 |
|---|---|---|---|---|
| dev00000001 | PRINTER MODEL :PrinterA | PRINTER NAME :MyPrinterA INSTALLATION LOCATION :Room111 | https://127.0.0.1/redirect/device https://[::1]/redirect/device | #0000001 |

*FIG. 8C*

AUTHORIZED TOKEN MANAGEMENT TABLE 1800

| AUTHORIZED TOKEN ID 1801 | TOKEN TYPE 1802 | EXPIRATION DATE AND TIME 1803 | SCOPE 1804 | REFRESH TOKEN ID 1805 | REFRESH TIME LIMIT 1806 | CLIENT ID 1807 | USER ID 1808 |
|---|---|---|---|---|---|---|---|
| AT_000000 | AUTHORIZATION CODE | 2013/09/30 11:00.00 | RESOURCE A | | | dev00000001 | uid00000001 |
| AT_000001 | PARENT TOKEN | 2013/09/30 12:00.00 | RESOURCE A | RT_000001 | 2014/09/30 12:00.00 | dev00000001 | uid00000001 |
| AT_000002 | CHILD TOKEN | 2013/09/30 13:00.00 | RESOURCE A | | | dev00000001 | uid00000001 |
| AT_000003 | PARENT TOKEN | 2013/09/30 16:00.00 | RESOURCE A | RT_000002 | 2014/09/30 16:00.00 | dev00000001 | uid00000002 |

*FIG. 13A*

| APPLICATION NAME | BUTTON INFORMATION (CHARACTER STRING, IMAGE) | WEB CONTENT INFORMATION (URL, CHARACTER STRING, IMAGE) |
|---|---|---|
| COPY | COPY, copy.png | ×(NONE) |
| SEND | SEND, send.png | http://127.0.0.1/send/ID.html, SEND AUTHENTICATION, send_ID.png |
| WEB BROWSER | WEB BROWSER, brws.png | http://www.xxx.co.jp/weather.html,WEATHER,weather.png |
| CLOUD AUTHENTICATION | ×(NONE) | http://127.0.0.1/cloud/ID.html, CLOUD AUTHENTICATION, cloud_ID.png |

*FIG. 13B*

| APPLICATION NAME | BUTTON INFORMATION (CHARACTER STRING, IMAGE) | WEB CONTENT INFORMATION (URL, CHARACTER STRING, IMAGE) |
|---|---|---|
| COPY | COPY, copy.png | ×(NONE) |
| WEB BROWSER | WEB BROWSER, brws.png | http://www.xxx.co.jp/weather.html,WEATHER,weather.png |
| CLOUD AUTHENTICATION | ×(NONE) | http://127.0.0.1/cloud/ID.html, CLOUD AUTHENTICATION, cloud_ID.png |

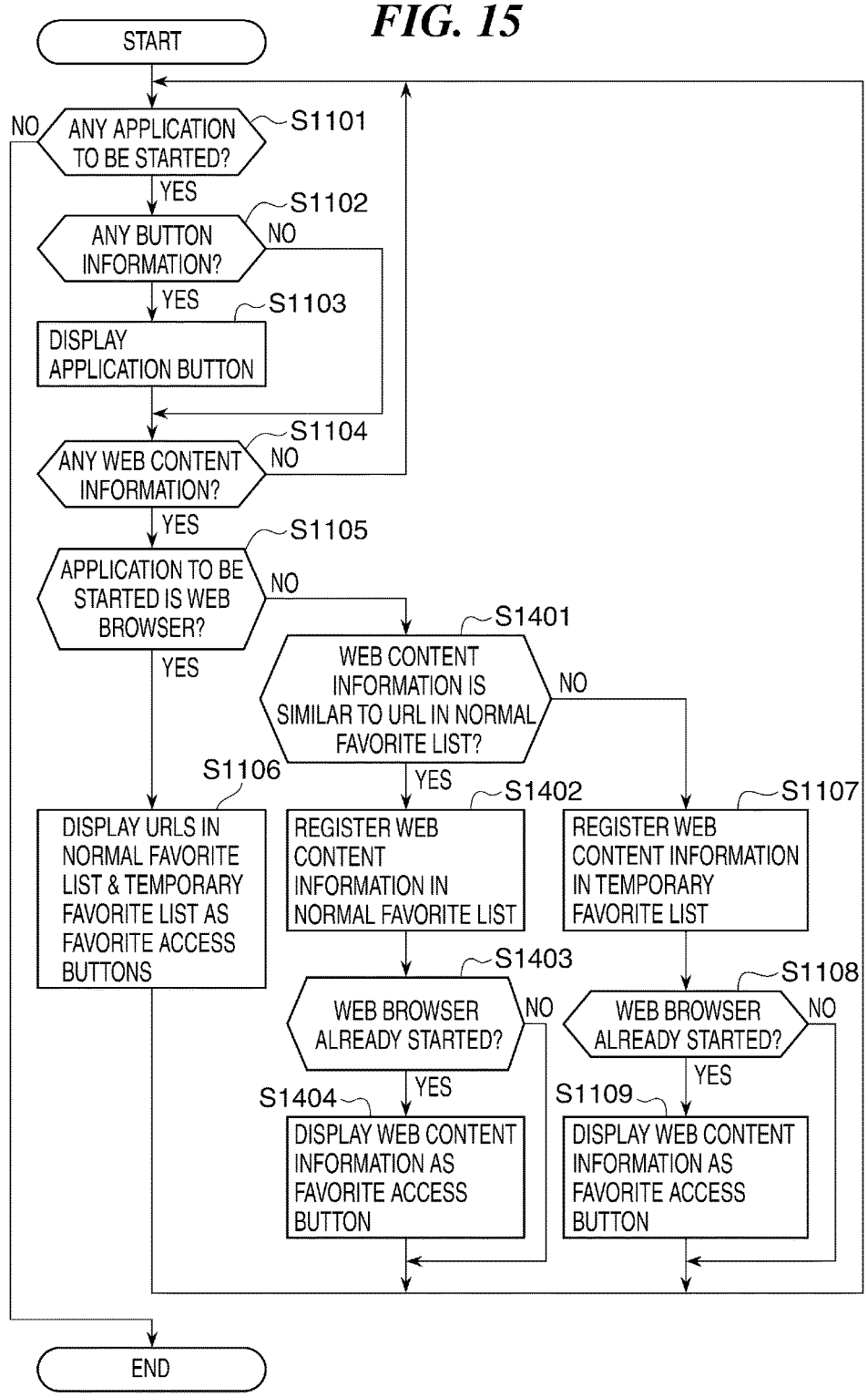

IMAGE FORMING APPARATUS THAT DISPLAYS BUTTON FOR ACCESSING SERVER, METHOD OF CONTROLLING THE SAME, AND STORAGE MEDIUM

BACKGROUND OF THE INVENTION

Field of the Invention

The present invention relates to an image forming apparatus that displays a button for accessing a server, a method of controlling the same, and a storage medium, and more particularly to an access control technique for controlling access to a cloud service using a Web browser on an image forming apparatus.

Description of the Related Art

There has been developed a business that provides services, as cloud services, by making the services open to the public on the Internet. A print server as well has come to be demanded to provide its function as a print service on the Internet. By providing the print service as a cloud service, it becomes unnecessary to arrange print servers in a large-scale data center and perform hardware management on a customer-by-customer basis. Further, the cloud service has various advantageous points, including facilitation of addition of resources depending on load on the server. For this reason, a print system has come to be provided that performs pull printing in which a printer acquires print data from a print server via the Internet and performs printing.

Access to a print server operated on an intranet has been limited within the intranet, and hence it is very difficult to illegally access the print server. However, in a case where a print server is open to the public as a cloud service on the Internet, the print server can be accessed from anywhere in the world, and hence security is critically important. In recent years in which security has become increasingly important, a standard protocol called OAuth for realizing cooperation of authorization is formulated and started to be applied to exchange of data between the cloud service and a client of the service (see "The OAuth 1.0 Protocol", [online] E. Hammer-Lahav, April 2010 <URL http://tools.ietf.org/html/rfc5849>, "The OAuth 2.0 Authorization Framework draft-ietf-oauth-v2-31", [online] D. Hardt., Jul. 31, 2012 <URL http://tools.ietf.org/html/draft-ietf-oauth-v2-31>). In the OAuth protocol, as information for verifying authority delegated from a user or a client, information called a token is used. The cloud service can prevent unauthorized accesses by verifying the validity of the token sent from the client.

Now, let us consider a case where a multifunction peripheral (hereinafter referred to as the "image forming apparatus") as a multifunction machine that integrates the functions of a printer, a copy machine, a facsimile machine, and so forth, is an OAuth client, and cooperates with a cloud service. In this case, a user delegates authority of access to resources of the cloud service to the image forming apparatus, whereby the image forming apparatus becomes capable of cooperating with the cloud service. When the image forming apparatus actually performs print processing in cooperation with a server which provides the cloud service, it is envisaged that the image forming apparatus makes use of Web access by a Web browser installed therein.

However, to access the server using the Web browser of the image forming apparatus, the user is required to directly input a URL of the server. This brings about a problem that in case the user inputs an incorrect URL by mistake, the access is rejected as an error.

SUMMARY OF THE INVENTION

The present invention provides a technique that makes it possible to easily create an access button on a Web browser, for accessing a server from an image forming apparatus, and thereby simplify the user's operation.

In a first aspect of the present invention, there is provided an image forming apparatus that is capable of communicating with a server via a network, comprising a request unit configured to request the server to perform authentication of the image forming apparatus, a reception unit configured to receive a result of the authentication from the server requested to perform the authentication, a registration unit configured to register favorite information including a URL of the server in a case where the result of the authentication received by the reception unit indicates success, and a display unit configured to display, based on the favorite information, a button for accessing the server.

In a second aspect of the present invention, there is provided a method of controlling an image forming apparatus that is capable of communicating with a server via a network, comprising requesting the server to perform authentication of the image forming apparatus, receiving a result of the authentication from the server requested to perform the authentication, registering favorite information including a URL of the server in a case where the result of the authentication received by said receiving indicates success, and displaying, based on the favorite information, a button for accessing the server.

In a third aspect of the present invention, there is provided a non-transitory computer-readable storage medium storing a computer-executable program for executing a method of controlling an image forming apparatus that is capable of communicating with a server via a network, wherein the method comprises requesting the server to perform authentication of the image forming apparatus, receiving a result of the authentication from the server requested to perform the authentication, registering favorite information including a URL of the server in a case where the result of the authentication received by said receiving indicates success, and displaying, based on the favorite information, a button for accessing the server.

According to the present invention, it is possible to easily create an access button on a Web browser, for enabling the image forming apparatus to access a server, and simplify the user's operation by saving the user from inputting a URL on the Web browser on the device.

Further features of the present invention will become apparent from the following description of exemplary embodiments (with reference to the attached drawings).

BRIEF DESCRIPTION OF THE DRAWINGS

FIG. 3 is a block diagram of the software configuration of the image forming apparatus appearing in FIG. 1.

FIGS. 4A and 4B are diagrams showing examples of table information stored in an external memory of the image forming apparatus, in which FIG. 4A shows a device user management table, and FIG. 4B shows a device management table.

FIGS. 5A and 5B are diagrams showing examples of table information stored in the external memory of the image forming apparatus, in which FIG. 5A shows a parent token management table, and FIG. 5B shows a Web browser favorite management table.

FIGS. 8A to 8C are diagrams showing examples of table information stored in an external memory of the authorization server, in which FIG. 8A shows a user management table, FIG. 8B shows a client management table, and FIG. 8C shows an authorization token management table.

FIGS. 9A to 9C are diagrams showing examples of a screen displayed on a Web browser of the image forming apparatus, in which FIG. 9A shows an authorization cooperation start screen, FIG. 9B shows a login screen, and FIG. 9C shows an authorization confirmation screen.

FIGS. 13A and 13B are diagram showing examples of a starting application table, in which FIG. 13A shows an example at the time of display of the initial screen shown in FIG. 10, and FIG. 13B shows an example after deletion or stoppage of send application in the starting application table shown in FIG. 13A.

FIG. 15 is a flowchart of a process for displaying the initial screen according to a variation of the embodiment.

DESCRIPTION OF THE EMBODIMENTS

The present invention will now be described in detail below with reference to the accompanying drawings showing embodiments thereof.

Figure 1:
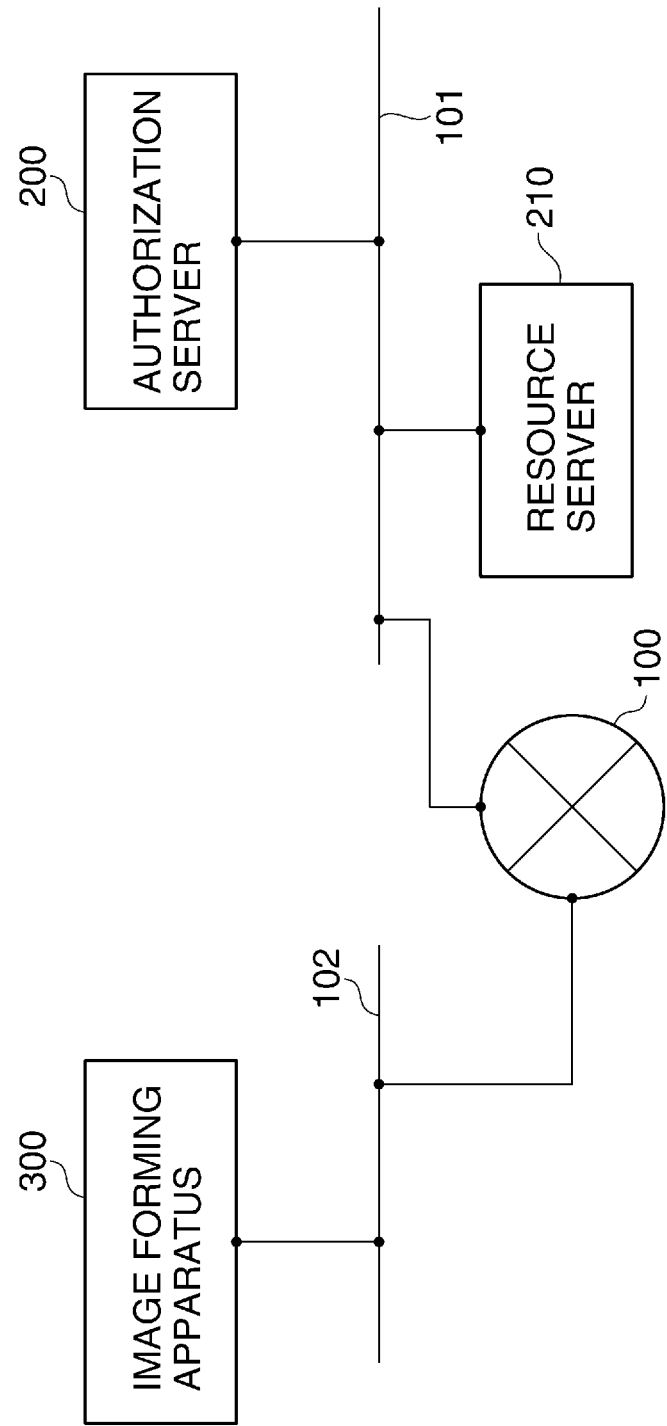
FIG. 1 is a diagram of an example of a network environment in which an image forming apparatus according to an embodiment of the present invention is installed.

FIG. 1 is a diagram of an example of a network environment in which an image forming apparatus according to an embodiment of the present invention is installed.

The image forming apparatus, denoted by reference numeral 300, is connected to a WAN (Wide Area Network) 100 via a LAN (Local Area Network) 102. On the WAN 100, a World Wide Web (WWW) system is constructed.

The image forming apparatus 300 has one or a plurality of resource service cooperation applications, such as a print application and a business form application, installed therein for using resource services. A user uses the resource services by using these resource service cooperation applications. Note that the resource services are not limited to the business form service and the print service. Further, the resource service cooperation applications are not limited to the business form application and the print application.

An authorization server (authentication server) 200 is a server (information processing apparatus) for realizing the above-mentioned OAuth, and provides an authorization service.

A resource server 210 provides the resource services, such as the print service for acquiring data on the Internet, and printing the acquired data, and the business form service for generating business form data, on the Internet. Note that the resource service installed on the one resource server may be one or a plurality of services.

The authorization server 200 and the resource server 210 are connected to the WAN 100 via a LAN 101.

The authorization server 200, the resource server 210, and the image forming apparatus 300 may be installed on different LANs, respectively, or may be installed on the same LAN. Further, the authorization server 200 and the resource server 210 may be installed on the same server.

For example, when a user uses a resource service using a print application, it is necessary to individually authorize the print application. Similarly, when a user uses a resource service using a business form application, it is also necessary to individually authorize the business form application. From a user' point of view, in a case where the user uses the resource services using the same image forming apparatus, it is more convenient for the user to be capable of using the resource services through authorization of the applications by a single authorizing operation.

To this end, in the present embodiment, authority of a user is delegated to a device, such as an image forming apparatus. Further, when delegating the authority to an application (resource service cooperation application), the image forming apparatus delegates the authority to the application on behalf of the user to thereby reduce the number of times of authorization operation performed by the user. That is, when the user has delegated the authority to the image forming apparatus, it is regarded that at this time, the user has also allowed the authority to be delegated to applications. The above-mentioned OAuth uses information called a token as information for verifying the authority delegated from the user. A token used when the user has delegated the authority to the image forming apparatus is referred to as a parent token.

To accomplish a plurality of authorization operations by a single operation, a method, for example, is envisaged in which a parent token acquired by the image forming apparatus is shared by applications operating on the image forming apparatus. However, according to this method, all applications sharing the parent token are enabled to access all resource services, which is not preferable. This is because when one of the applications accesses the resource service using the shared parent token, the application as an access source cannot be identified by the resource service side, which makes it impossible to determine whether or not to permit the application to use the resource service.

To solve this problem, in the present embodiment, each of individual resource service cooperation applications does not directly use the parent token, but uses a token issued by delegating the authority again on an application-by-application basis while inheriting the information delegated to the parent token. The token issued by delegating the authority again on an application-by-application basis is referred to as a child token.

Figure 2A:
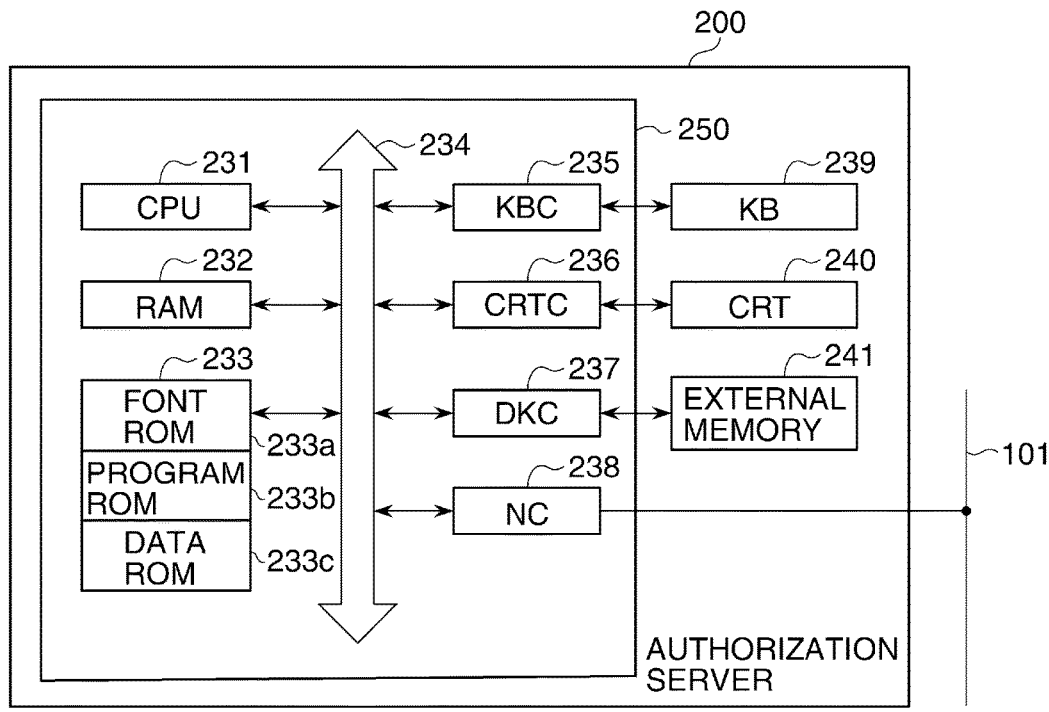
FIG. 2A is a block diagram of the hardware configuration of an authorization server appearing in FIG. 1.
Figure 2B:
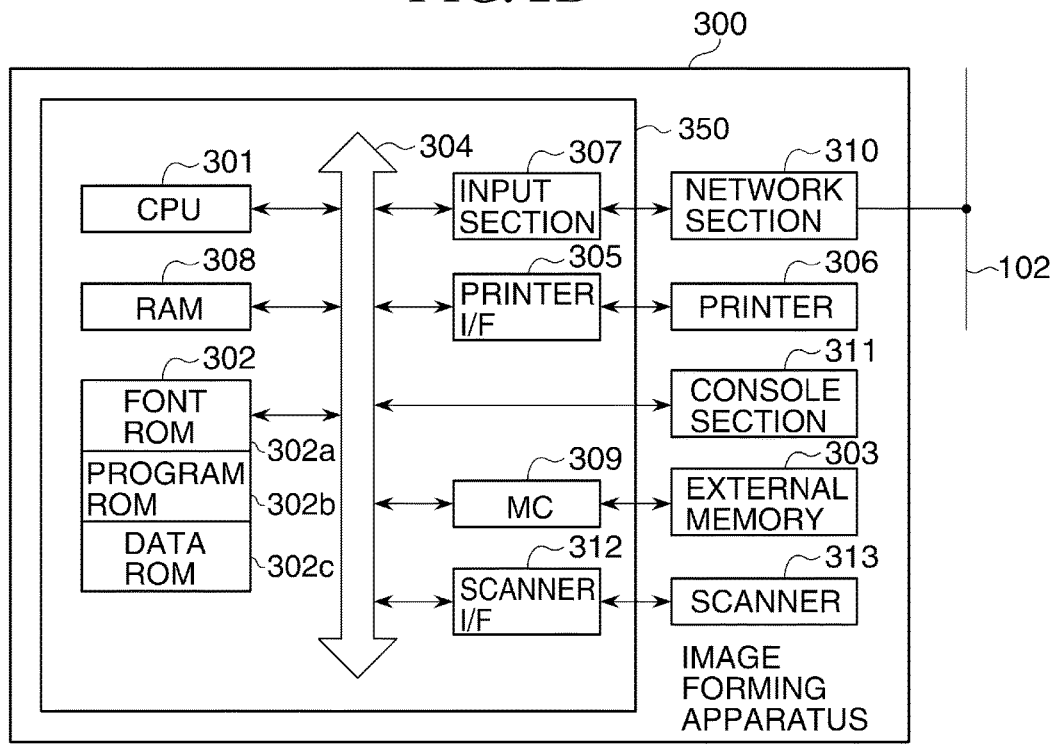
FIG. 2B is a block diagram of the hardware configuration of the image forming apparatus appearing in FIG. 1.

FIGS. 2A and 2B are block diagrams of the hardware configuration of the authorization server 200 and that of the image forming apparatus 300 both appearing in FIG. 1.

First, the hardware configuration of the authorization server 200 will be described with reference to FIG. 2A.

The authorization server 200 has the same hardware configuration as that of a general information processing apparatus. This applies not only to the authorization server 200 but also to the resource server 210, and hence description of the hardware configuration of the resource server 210 is omitted.

Referring to FIG. 2A, the authorization server 200 has a controller 250 composed of a CPU 231, a ROM 233, a RAM 232, a keyboard controller (KBC) 235, a CRT controller (CRT) 236, a disk controller (DKC), a network controller (NC) 238, and a system bus 234. The CPU 231 executes programs, such as an OS (Operating System) and applications loaded from a program ROM 233b of the ROM 233 or an external memory 241, such as a hard disk (HD), into the RAM 232. Further, the CPU 231 controls components of the controller 250 connected to the system bus 234 of the same. The ROM 233 is composed of the program ROM 233b, a font ROM 233a storing font data and the like, and a data ROM 233c.

The RAM 232 functions as a main memory and a work area for the CPU 231. The keyboard controller 235 controls key inputs from a keyboard (KB) 239 and a pointing device, not shown. The CRT controller 236 controls display on the CRT display 240.

The disk controller 237 controls data access to the external memory 241, such as the hard disk, which stores various data. The network controller 238 executes processing for controlling communication with the image forming apparatus 300 and other devices, which are connected to the controller 250 via the WAN 100 or the LAN 101.

Note that in all of descriptions given hereinafter, an actor in terms of hardware that executes processing on the server is the CPU 231, and an actor in terms of software that executes processing on the same is an application program installed in the external memory 241, unless otherwise specified.

Next, the hardware configuration of the image forming apparatus 300 will be described with reference to FIG. 2B.

The image forming apparatus 300 has a controller 350 composed of a CPU 301, a ROM 302, a RAM 308, an input section 307, a printer interface 305, a memory controller (MC) 309, a scanner interface 312, and a system bus 304. The CPU 301 controls components of the controller 350 connected to the system bus 304 based on the control programs stored in the ROM 302 and an external memory 303. An image signal generated by processing performed by the CPU 301 is output to a printer (image forming apparatus engine) 306 via the printer interface 305 as output information. Further, the CPU 301 is capable of communicating with the authorization server 200 via the input section 307 and a network section 310, and can notify the authorization server 200 of e.g. information stored in the image forming apparatus 300.

A program ROM 302b of the ROM 302 stores the control programs and the like executed by the CPU 301. A font ROM 302a of the ROM 302 stores font data and the like used when generating the output information. In a case where the external memory 303, such as a hard disk, is not provided, a data ROM 302c of the ROM 302 stores information and the like transmitted and received to and from the authorization server 200.

The RAM 308 functions as a main memory, a work area for the CPU 301, and so forth, and is configured to be capable of expanding the memory capacity by using an option RAM connected to an extension port, not shown. Further, the RAM 308 is used as an output information-loading area, an environmental data-storing area, and so forth.

Access to the external memory 303 is controlled by the memory controller 309. The external memory 303 is connected as an option memory to store the font data, an emulation program, form data, etc. A scanner interface (I/F) 312 is connected to a scanner 313 that reads an image from an original, and enables output and input of signals to and from the scanner 313. A console section 311 is composed of switches for operation by a user, an LED display device, etc.

FIG. 3 is a block diagram of the software configuration of the image forming apparatus 300 appearing in FIG. 1.

In the image forming apparatus 300, the CPU 301 controls various applications by executing the OS stored in the ROM 302 or the external memory 303.

Referring to FIG. 3, an application management frame work 800 has a function of managing life cycles of applications to be managed, which operate on an application runtime environment provided by a virtual machine 810 implemented e.g. by Java (registered trademark) VM. Further, the application management frame work 800 is provided with a control interface for management of the life cycles of applications, and has a function of mediating a processing request between applications. Note that the life cycle indicates a state of each application, including installation, start, stop, and uninstallation of the application. The application management frame work 800 in the present embodiment is an OSGi (registered trademark) defined by OSGi (Open Services Gateway initiative) alliance.

The virtual machine 810 is a virtual application runtime environment which operates as an application controlled by an OS (Operating System) 820. Although a real time OS is generally used as the OS 820, a general-purpose OS, such as Linux (registered trademark), is sometimes used recently.

A Web browser 900 is a user agent for using the WWW.

An application management application 830 receives requests from a user for installing and starting various applications via the control interface for use in life cycle management, which is made open to the public by the application management frame work 800.

A local login application 840 has a function of displaying a screen (not shown) on the console section 311 of the image forming apparatus 300, for receiving inputs of a user ID and a password from a user.

Further, the local login application 840 determines whether or not a combination of the inputs of the input user ID and the password matches a combination of a user ID 1501 and a password 1502, appearing in FIG. 4A, and if the combination of the inputs is correct, the local login application 840 generates a login context including information of the user ID 1501. The login context is an object in which the information of the user ID 1501 of the authenticated user is set. Further, other attribute information of the user, such as a domain to which the user belongs to and an e-mail address of the user, may be set in the login context.

Further, the local login application 840 acquires IC card information from an IC card reader, not shown, which is connected to the image forming apparatus 300. Then, the local login application 840 determines whether or not there is a match between the acquired information and IC card information 1503 appearing in FIG. 4A, and if there is a match, the local login application 840 generates a login context including the information of the associated user ID 1501 to thereby authenticate the user.

Figure 6A:
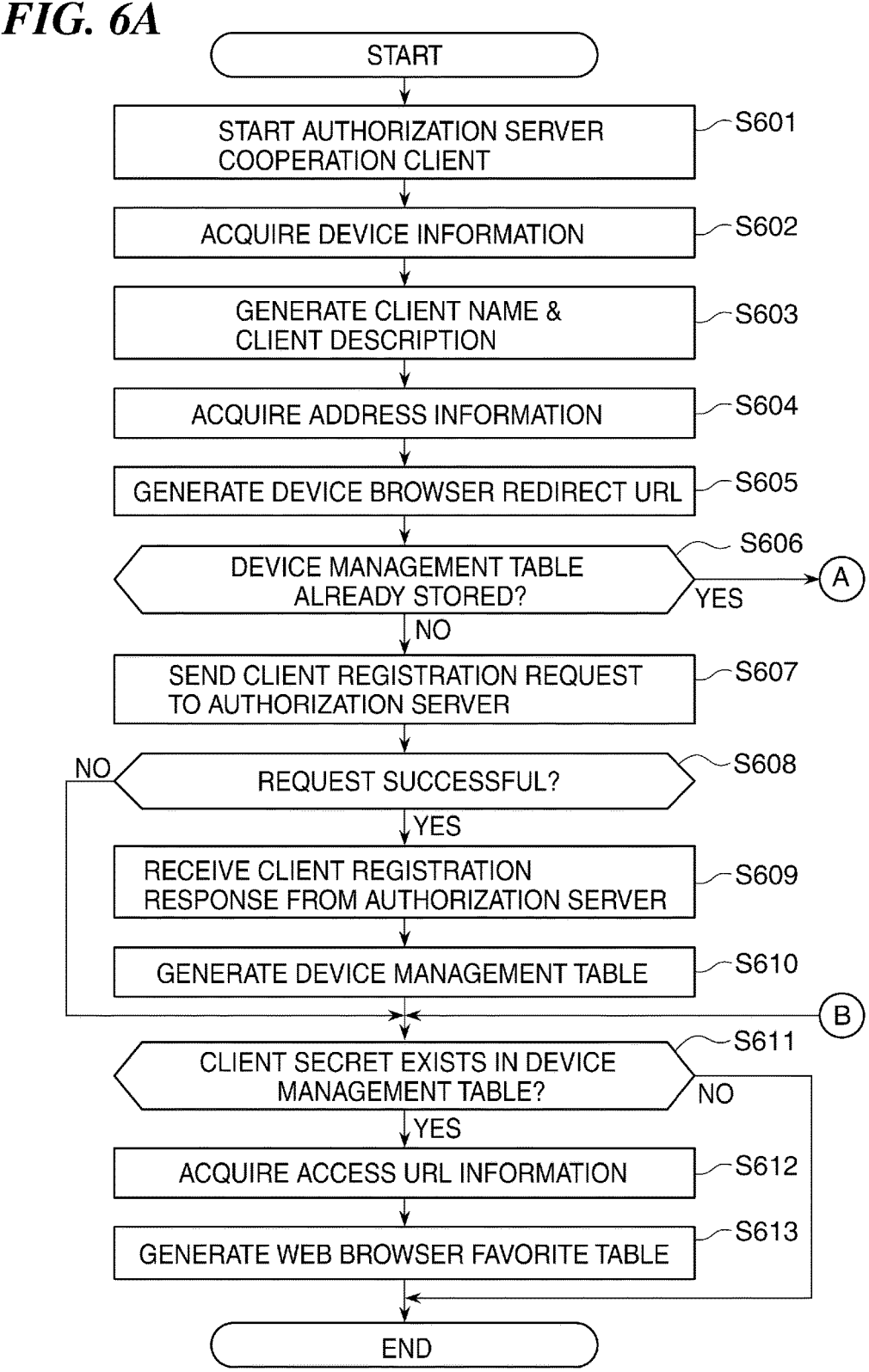
FIG. 6A is a flowchart of a process for registering or updating client information at the startup of an authorization server cooperation client, and registering Web browser favorite information.
Figure 6B:
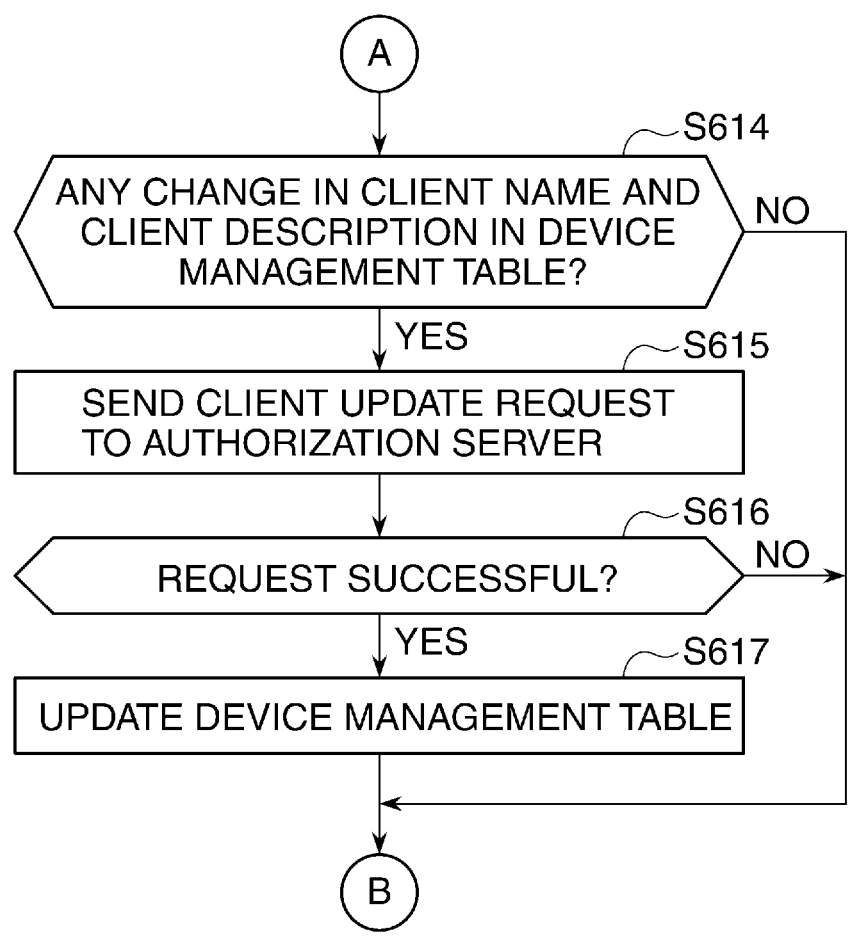
FIG. 6B is a continuation of FIG. 6A.

An authorization server cooperation client 400 (authorization application) is an application that executes a process shown in FIGS. 6A and 6B, described hereafter, and performs user authorization in cooperation with the authorization server 200. A resource service cooperation application 500 is one or the plurality of applications that use the resource services, as mentioned hereinabove, such as the print application and the business form application.

The local login application 840, the authorization server cooperation client 400, and the resource service cooperation application 500 operate in the runtime environment of the virtual machine 810. Further, the life cycles of these applications are managed by the application management frame work 800.

Note that the image forming apparatus 300 has the Web browser 900, the application management application 830, the local login application 840, and a network status periodic monitor 910, installed therein in advance. On the other hand, the authorization server cooperation client 400 and the resource service cooperation application 500 are installed later via the application management application 830 and the application management frame work 800.

In a case where the authorization server cooperation client 400 is no longer used, the authorization server cooperation client 400 is uninstalled via the application management application 830 and the application management frame work 800. The application management application 830 refers to registered applications 1903 in a Web browser favorite management table 1900 shown in FIG. 5B, and deletes information associated with the authorization server cooperation client 400 from the table 1900 (deletion application).

Next, table information stored in the external memory 303 of the image forming apparatus 300 will be described with reference to FIGS. 4A, 4B, 5A, and 5B.

FIG. 4A is a diagram of an example of a device user management table.

The device user management table, denoted by reference numeral 1500, is composed of columns of the user ID 1501, the password 1502, and the IC card information 1503.

The local login application 840 appearing in FIG. 3 is configured to be capable of referring to and updating the device user management table 1500. Although in the present embodiment, the device user management table 1500 is stored in the external memory 303 of the image forming apparatus 300, it may be stored in a server with which the image forming apparatus 300 can communicate via the LAN 101.

FIG. 4B is a diagram of an example of a device management table.

Only the authorization server cooperation client 400 is configured to be capable of referring to and updating the device management table, denoted by reference numeral 1600.

The device management table 1600 is composed of columns of a client ID 1601, a client secret 1602, an end point URL 1603, a client name 1605, a client description 1606, a redirect URL 1607, and an access URL 1608.

The client ID 1601 and the client secret 1602 correspond to a user ID 1301 and a password 1302, which have been issued and stored by the authorization server 200 in advance, respectively. Further, the client name 1605, the client description 1606, and the redirect URL 1607 are stored as a client name 1605, a client description 1606, and a redirect URL 1607 in a client management table 1400, shown in FIG. 8B, which is stored in the authorization server 200. Further, the client management table 1400 in FIG. 4B stores the client ID 1601 as a client ID 1401, and also stores a serial number 1405 of the image forming apparatus 300.

The above-described client information is registered and updated in the authorization server 200 by the authorization server cooperation client 400 at the times of the startup of the authorization server cooperation client 400 and the start of the authorization cooperation.

The end point URL 1603 indicates a URL of an end point, made open to the public by the authorization server 200, for OAuth. The access URL 1608 indicates a URL made open to the public by the authorization server cooperation client 400 for access from the Web browser at the start of authorization, and a name of a favorite button indicative of the URL (hereinafter referred to as "favorite name").

FIG. 5A is a diagram of an example of a parent token management table.

Only the authorization server cooperation client 400 is configured to be capable of referring to and updating the parent token management table, denoted by reference numeral 1700.

The parent token management table 1700 is composed of columns of a use ID 1701, an authorized token ID 1702, and a refresh token ID 1703.

FIG. 5B is a diagram of an example of a Web browser favorite management table.

The Web browser 900, the authorization server cooperation client 400, and the application management application 830 are configured to be capable of referring to and updating the Web browser favorite management table, denoted by reference numeral 1900.

The Web browser favorite management table 1900 is composed of columns of a favorite name 1901, a URL 1902, the registered application 1903, and an enable/disable flag 1904. Values of the favorite name 1901, the URL 1902, and the registered application 1903 are registered at the time of the startup of the authorization server cooperation client 400. Registration of these values in the Web browser favorite management table 1900 will be described in detail, hereinafter.

The favorite name 1901 is a name of a button provided on a GUI by the Web browser 900 as a favorite button. The URL 1902 is a URL as an end point for starting a start screen of the Web browser when the favorite button is pressed. The registered application 1903 is a name of an application for which the favorite button has been registered. The enable/disable flag 1904 is a flag (discrimination information) for discriminating a network connection status. When a disconnected state of the network is recognized based on a result of monitoring of the network communication status by the network status periodic monitor 910 (monitoring application), the flag is disabled, whereby the favorite button is made temporarily unusable when the network cannot be used. When the network connection status is recovered to the normal status, the flag is enabled.

Next, a description will be given of registration or update of client information and generation of the Web browser favorite management table, which is performed in cooperation with the authorization server 200 at the startup of the authorization server cooperation client 400.

The application management frame work 800 checks for existence of information in the Web browser favorite management table 1900, in which the registered application 1903 is the authorization server cooperation client 400. If there exists no such information, the application management frame work 800 checks for existence of the authorization server cooperation client 400. If the authorization server cooperation client 400 exists, the authorization server cooperation client 400 is started to thereby execute a process for registering or updating the client information and registering the Web browser favorite, described hereafter.

FIGS. 6A and 6B are a flowchart of the process for registering or updating the client information and generating the Web browser favorite table at the startup of the authorization server cooperation client 400. In the present embodiment, an actor in terms of hardware that executes processing on the image forming apparatus is the CPU 301, and an actor in terms of software that executes processing on the same is an application program installed in the external memory 303, unless otherwise specified.

Referring to FIG. 6A, the application management frame work 800 starts the authorization server cooperation client 400 (step S601) and the authorization server cooperation client 400 acquires device information of the image forming apparatus 300 (step S602). The device information acquired in this step includes a printer model name, a printer name, an installation location, and a serial number.

Next, the authorization server cooperation client 400 generates a client name and client description using the device information acquired in the step S602 (step S603). The generated client name and client description are indicated by character strings as shown in FIG. 4B. In the present embodiment, the printer model name is used for the client name, and the printer name and the installation location are used for the client description. The client name and client description are displayed on an authorization confirmation screen 2003, referred to hereinafter, and hence the character strings which enable the user to identify the image forming apparatus 300 are desired. Note that the printer name and the installation location can be changed to desired values by a user, and if the values have been changed, it is necessary to change the client name and the client description in accordance with the change.

Next, the authorization server cooperation client 400 acquires address information of the image forming apparatus 300 (step S604). The address information includes a loopback IPv4 address and a loopback IPv6 address.

Next, the authorization server cooperation client 400 generates a device browser redirect URL based on the address information acquired in the step S604 (step S605). More specifically, the authorization server cooperation client 400 generates the device browser redirect URL based on the loopback IPv4 address or the loopback IPv6 address as a FQDN (Fully Qualified Domain Name). The generated device browser redirect URL is formed as the redirect URL 1607 as shown in FIG. 4B. In the present embodiment, "https" (Hypertext Transfer Protocol Secure) is used for a transfer protocol, and the end point of the device browser redirect URL is set as "redirect/device".

Next, the authorization server cooperation client 400 determines whether or not the device management table 1600 has already been created and stored (step S606). If it is determined that the device management table 1600 has not been created, the CPU 301 proceeds to a step S607, whereas if it is determined that the device management table 1600 has already been created and stored, the CPU 301 proceeds to a step S614 in FIG. 6B.

In the step S607, the authorization server cooperation client 400 sends a client registration request to the authorization server 200 using the client name, the client description, and the redirect URL, generated in the steps S602 and S605, and the serial number acquired in the step S602 (step S607). Then, the authorization server cooperation client 400 determines whether or not the client registration request is successful (step S608). If the client registration request is successful, the CPU 301 proceeds to a step S609, whereas if not, the CPU 301 proceeds to a step S611.

In the step S609, the authorization server cooperation client 400 receives a client ID and a client secret from the authorization server 200 as a client registration response (authentication result). Then, the authorization server cooperation client 400 generates the device management table 1600 as shown in FIG. 4B using the client ID, the client secret, the client name, the client description, and the redirect URL, and stores the generated device management table 1600 in the external memory 303 (step S610). Further, the authorization server cooperation client 400 generates a URL made open to the public thereby for access from the Web browser and a favorite name, thereby registering the generated URL and favorite name in the device management table 1600 as the access URL 1608, and registers the end point of the authorization server 200 in the end point URL 1603 (step S610).

On the other hand, if it is determined in the step S606 that the device management table 1600 has already been stored, the CPU 301 proceeds to the step S614 in FIG. 6B, wherein the authorization server cooperation client 400 refers to the values of the client name 1605, the client description 1606, and the redirect URL 1607, in the device management table 1600 stored in the external memory 303. Then, the authorization server cooperation client 400 compares the values with the client name and the client description, generated in the step S603, and the redirect URL generated in the step S605, and determines whether or not the values have changed. Note that the printer name, and the printer name and the installation location used for the client description can be changed.

If it is determined in the step S614 that the values have not changed, the CPU 301 proceeds to the step S611 in FIG. 6A. On the other hand, if it is determined in the step S614 that the values have changed, the CPU 301 proceeds to a step S615, wherein the authorization server cooperation client 400 sends a client update request to the authorization server 200 (step S615). The authorization server cooperation client 400 notifies the authorization server 200 of the client ID 1601 and the client secret 1602 in the device management table 1600 by the client update request. Further, the authorization server cooperation client 400 notifies the authorization server 200 of the client name and client description generated in the step S603, the redirect URL generated in the step S605, and the serial number acquired in the step S602.

Next, the authorization server cooperation client 400 determines whether or not the client update request is successful (step S616). If the client registration request is successful, the authorization server cooperation client 400 updates the device management table 1600 with the information notified by the client update request (step S617), and the CPU 301 proceeds to the step S611 in FIG. 6A. If it is determined in the step S616 that the client registration request is not successful, the CPU 301 directly proceeds to the step S611 in FIG. 6A.

In the step S611 in FIG. 6A, the authorization server cooperation client 400 determines whether or not the client secret 1602 is stored in the device management table 1600. If it is determined that the client secret 1602 is stored in the device management table 1600, the CPU 301 proceeds to a step S612, whereas if not, the present process is terminated.

Figure 10:
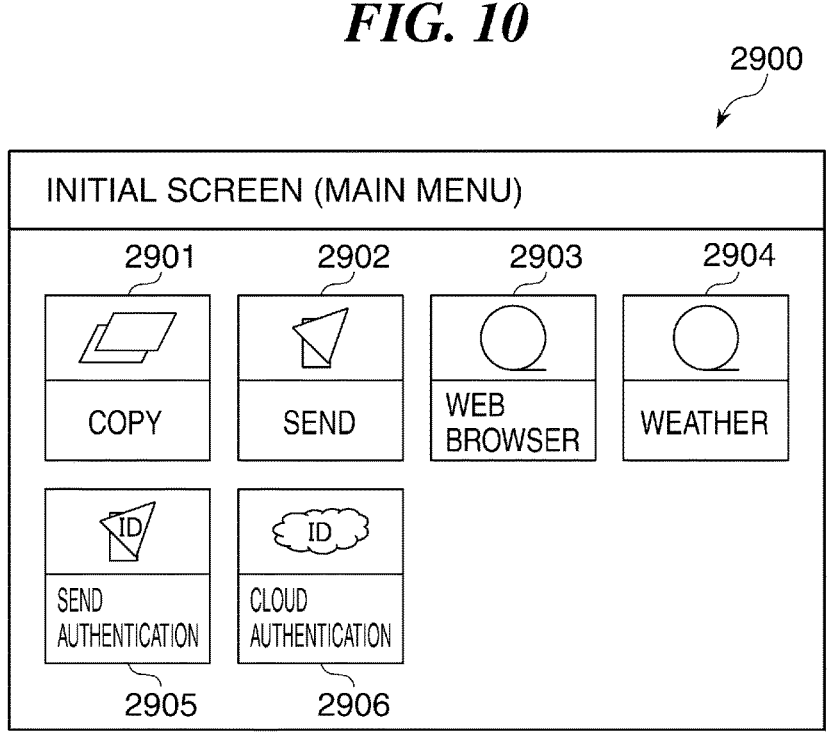
FIG. 10 is a diagram of an example of an initial screen displayed on a console section of the image forming apparatus.

In the step S612, the authorization server cooperation client 400 acquires information of the access URL 1608 in the device management table 1600. Then, the authorization server cooperation client 400 registers the favorite information including the acquired access URL 1608 in the Web browser favorite management table 1900 (step S613), followed by terminating the present process. The image forming apparatus 300 displays an initial screen 2900 on which a favorite access button 2906 is arranged as shown in FIG. 10 based on the favorite information registered in the step S613. The favorite access button (cloud authentication) 2906 on the initial screen 2900 shown in FIG. 10 is a short-cut button to access a URL for having an authorized token issued which the image forming apparatus 300 requested the authentication service of the authorization server 200 to authenticate.

Next, a description will be given of a method in which a user performs authority delegation, using the Web browser 900, in a state logged in the image forming apparatus 300, with reference to FIGS. 7, 8A to 8C, 9A to 9C, and 10.

Figure 7:
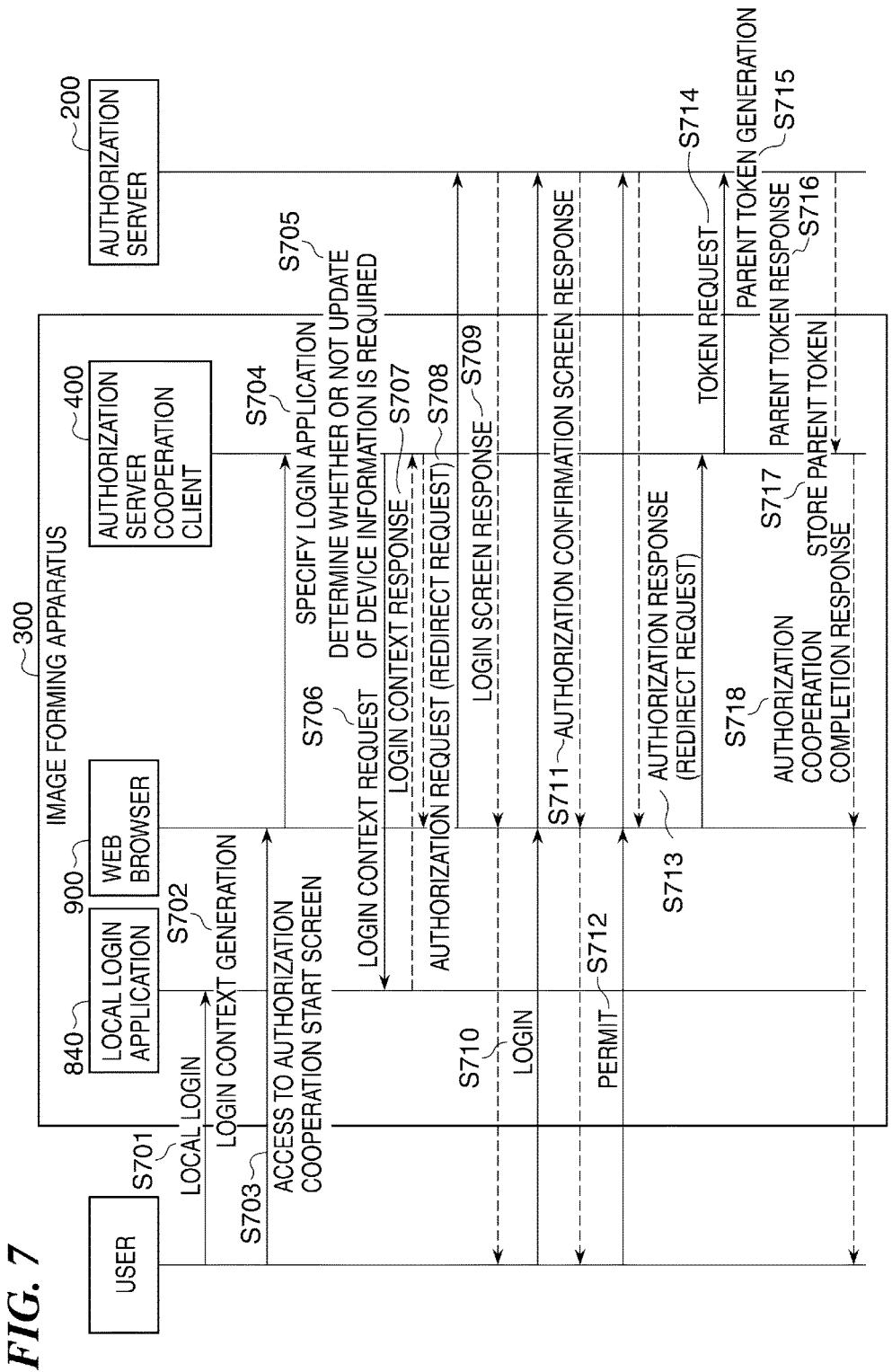
FIG. 7 is a sequence diagram showing a flow of a process performed when the image forming apparatus requests authorization from the authorization server.

FIG. 7 is a sequence diagram showing a flow of a process performed when the image forming apparatus 300 makes an authorization request to the authorization server 200. The illustrated sequence is executed using the Web browser of the image forming apparatus 300, only once when a user uses the image forming apparatus 300 for the first time.

First, the user logs in the image forming apparatus 300 from an input screen provided by the local login application 840 (S701). Then, the local login application 840 generates a login context including the user ID of the logged-in user (S702).

When the favorite access button (cloud authentication) 2906 on the initial screen 2900 shown in FIG. 10 is pressed, an instruction for accessing a URL for starting authorization cooperation is sent from the Web browser 900 to the authorization server cooperation client 400 (S703). In this step, the Web browser 900 displays an authorization cooperation start screen 2001 shown in FIG. 9A. Then, the authorization server cooperation client 400 performs login application identification according to the instruction from the Web browser 900 (S704). Then, the authorization server cooperation client 400 determines whether or not the device information is required to be updated (S705), and if the device information is required to be updated, the authorization server cooperation client 400 sends a device information update request to the authorization server 200. Next, the authorization server cooperation client 400 sends a login context request to the local login application 840 (S706). In response to this, the local login application 840 sends back the login context generated in the step S702 to the authorization server cooperation client 400 (S707).

Next, the Web browser 900 sends an OAuth authorization request to a URL described in the end point URL 1603 in the device management table 1600 (the URL of the authorization server 200 in the present example) (S708). This authorization request includes the information of the client ID 1601 and the redirect URL 1607 in the device management table 1600. The redirect URL included in the authorization request is the device browser redirect URL, and uses a URL which matches the FQDN of the request received in the S703. Further, the OAuth authorization request may be configured to include a scope of authority desired to be authorized. In the present embodiment, it is assumed that a scope A is requested as the scope.

Figure 9A:
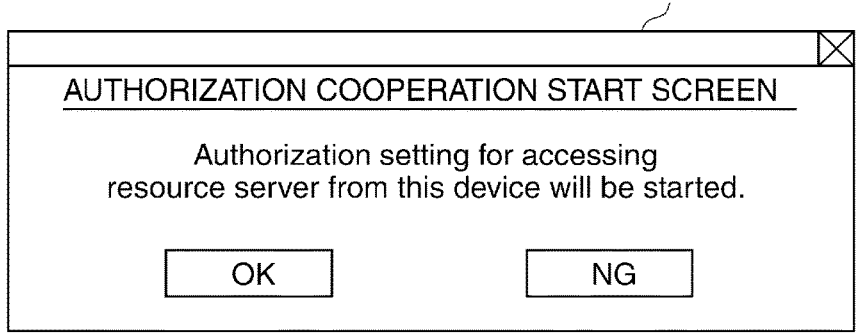
Figure 9B:
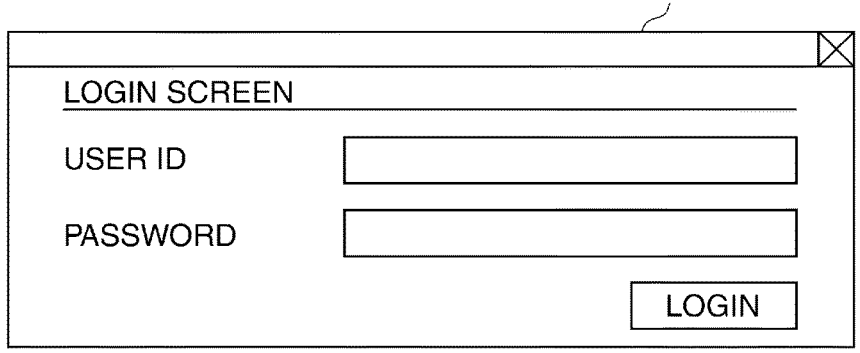
Figure 9C:
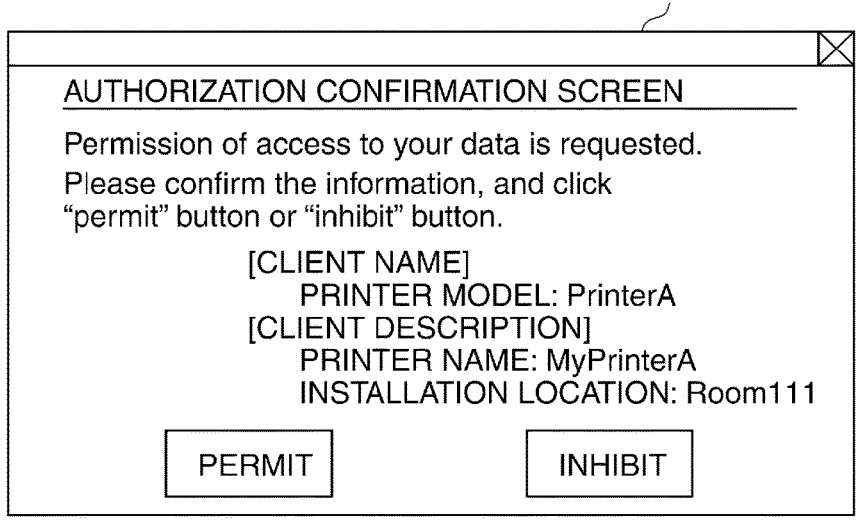

The authorization server 200 having received the authorization request generates a login screen 2002 shown in FIG. 9B, and sends a response to the Web browser 900 to cause the generated login screen 2002 to be displayed thereon (S709). The user inputs a user ID and a password on the login screen 1202 displayed on the Web browser 900 to thereby execute login (S710).

The authorization server 200 determines whether or not the combination of the received user ID and password matches information registered in a user management table 1300 shown in FIG. 8A, and if the combination of the received user ID and password matches the registered information, the authorization server 200 generates authentication information associated with the user ID, and executes the following process: The authorization server 200 verifies whether or not the combination of the client ID and redirect URL included in the authorization request matches information registered in the client management table 1400 shown in FIG. 8B. If the combination is verified to be correct, the authorization server 200 acquires a client name 1402 and a client description 1403 in the client management table 1400 to thereby generate the authorization confirmation screen 2003 shown in FIG. 9C, and sends a response to the Web browser 900 to cause the generated authorization confirmation screen 2003 to be displayed thereon (S711). At this time, the authorization server 200 sends the response to the Web browser 900 by storing the authentication information therein as Cookie information. Although in the present embodiment, the client name 1402 and the client description 1403 are displayed on the authorization confirmation screen 2003, the configuration may be such that the information of the logged-in user is displayed.

Next, when the user selects "permit" on the authorization confirmation screen 2003 displayed on the Web browser 900 (S712), the authorization server 200 having received the response "permit" executes the following process: First, the authorization server 200 issues an authorization code, and registers the issued authorization code in an authorized token management table 1800. At this time, the authorization server 200 registers an ID of the issued token in an authorized token ID 1801, the authorization code in a token type 1802, and an expiration date and time in an expiration date and time 1803. Further, the authorization server 200 registers the client ID received when the authorization request was received, in a client ID 1807, and the user ID associated with the authentication information sent from the Web browser 900 as Cookie, in a user ID 1808. Then, the authorization server 200 makes an authorization response (redirect request) to the Web browser 900 such that the response is redirected to the redirect URL to which the authorized token ID of the authorization code has been given (in this example, the authorization server cooperation client 400) (S713).

The authorization server cooperation client 400 having received the authorization response sends a token request to the authorization server 200 (S714). The token request includes the authorized token ID of the authorization code acquired by the authorization response, and the client ID 1601, the client secret 1602, and the redirect URL 1607 in the device management table 1600 shown in FIG. 4B.

The authorization server 200 having received the token request performs the following verification, and if verified to be correct, the authorization server 200 generates a parent token (S715). That is, the authorization server 200 verifies whether or not the combination of the client ID and the client secret included in the received token request matches the combination of the user ID 1301 and the password 1302, registered in the user management table 1300, shown in FIG. 8A. Next, the authorization server 200 verifies whether or not the authorized token ID of the authorization code included in the received token request have been registered in the authorized token management table 1800, shown in FIG. 8C, and is within the expiration date and time. Further, the authorization server 200 verifies whether or not the client ID and the redirect URL, included in the received token request, match the client ID 1807 and a redirect URL 1404, identified by the authorized token ID in the authorized token management table 1800, respectively. In the present embodiment, the configuration may be such that a column of the redirect URL 1404 is added not to the client management table 1400, but to the authorized token management table 1800, and the redirect URL 1404 is registered when the authorization code is issued, whereby verification may be performed using the added column.

If all the above-described verifications are correct, the authorization server 200 generates a parent token, and sends the authorized token ID of the parent token to the authorization server cooperation client 400 as a response (S716). This response also includes a refresh token ID which has been simultaneously issued. Note that for a parent token in the authorized token management table 1800, the ID of the issued token, the parent token, and the expiration date and time are registered in the authorized token ID 1801, the token type 1802, and the expiration date and time 1803, respectively. As information inherited from the authorization code, the client ID and the user ID are registered in the client ID 1807 and the user ID 1808, respectively. The refresh token ID for refreshing the parent token and a refresh time limit are registered in a refresh token ID 1805 and a refresh time limit 1806 in the authorized token management table 1800.

The authorization server cooperation client 400 having acquired the authorized token ID and the refresh token ID of the parent token acquires a device user ID from the login context acquired from the local login application 840. Then, the authorization server cooperation client 400 stores the device user ID, the authorized token ID of the parent token, and the refresh token ID in the parent token management table 1700 shown in FIG. 5A (S717).

Next, the authorization server cooperation client 400 sends a screen (not shown) indicative of completion of authorization cooperation to the Web browser 900 as a response (S718), followed by terminating the present process.

In the present embodiment, in a case where the resource service cooperation application 500 for using a resource service is additionally installed in the image forming apparatus 300, the authorization server cooperation client 400 is started up. This makes it possible to provide a favorite access button in a manner limited to a case where the resource service is required. Further, this saves the user time and effort of inputting the URL.

Next, a description will be give of the table information stored in the external memory 241 of the authorization server 200 with reference to FIGS. 8A to 8C. Note that the illustrated table information may be stored not in the external memory 241 of the authorization server 200, but in another server (not shown) configured to be capable of communicating with the image authorization server 200 via the LAN 101.

FIG. 8A is a diagram of an example of the user management table.

The user management table 1300 is composed of columns of the user ID 1301, the password 1302, and a user type 1303. The authorization server 200 has a function of authenticating each user or each client by determining whether a user ID and a password, input by a user, are valid, using the combination of the user ID 1301 and the password 1302, and generating authentication information associated with the user ID, if the input ID and password are valid.

FIG. 8B is a diagram of an example of the client management table.

The client management table 1400 is composed of columns of the client ID 1401, the client name 1402, the client description 1403, the redirect URL 1404, and the serial number 1405.

The client ID 1401 is associated with the user ID 1301 in the user management table 1300, and the client ID 1401 and the user ID 1301 can be referred to from each other. The client name 1402, the client description 1403, and the redirect URL 1404 are values used in an OAuth sequence, described hereinafter. The serial number 1405 is a value registered in a case where the client is a device, such as an image forming apparatus, and is a value with which the image forming apparatus can be uniquely identified.

FIG. 8C is a diagram of an example of the authorized token management table.

The authorized token management table 1800 is composed of columns of the authorized token ID 1801, the token type 1802, the expiration date and time 1803, a scope 1804, the refresh token ID 1805, the refresh time limit 1806, the client ID 1807, and the user ID 1808.

According to the above-described embodiment, authentication of the image forming apparatus is requested from the authorization server, and the result of authentication is received from the authorization server to which the authentication request has been sent. Then, if the received authentication result indicates success, the favorite information including the URL of the authorization server is registered in the Web browser favorite management table 1900, and the button for accessing the authorization server is displayed by the Web browser based on the favorite information. This makes it possible to easily create the access button for accessing the server from the image forming apparatus on the Web browser, and simplify the user's operation by saving the user from inputting a URL on the Web browser on the device.

FIG. 10 is a diagram of an example of the initial screen displayed on the console section of the image forming apparatus.

Referring to FIG. 10, the initial screen (main menu) 2900 is an initial screen displayed on the console section 311 by the CPU 301. The initial screen 2900 is displayed on the console section 311 in the first place as a screen which can be operated by the user after the power of the image forming apparatus 300 is switched on.

Further, the initial screen 2900 functions as a portal screen for accessing an application existing in the image forming apparatus 300. For this function, the application buttons for accessing the various applications, such as a copying application and a send application, are displayed.

For example, a copy button 2901 is an application button for changing the display to a screen of the copying application. Further, a send button 2902 is an application button for changing the display to a screen of the send application. Further, a Web browser button 2903 is an application button for changing the display to a screen of the Web browser 900. The initial screen 2900 further displays the favorite access buttons 2904, 2905, and 2906 for accessing the respective URLs registered in a favorite list of the Web browser 900.

Next, the screen displayed when the favorite access button (send authentication) 2905 is pressed will be described. Note that a URL of a Web content designated by the send application is stored in the favorite access button (send authentication) 2905 in a manner associated therewith. Note that the designated Web content is a Web content for registering an ID and a password required to perform transmission by the send application. In a case where the send application is deleted or stopped, it is impossible to access the URL of the Web content designated by the send application.

Figure 11:
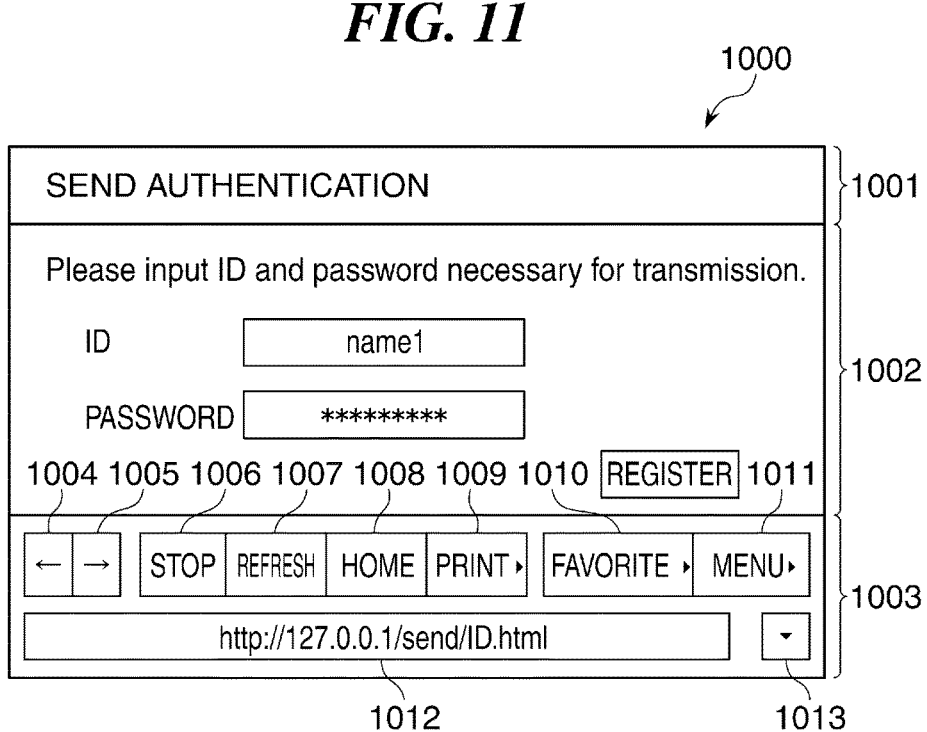
FIG. 11 is a diagram of an example of a Web browser screen switched when a favorite access button of send authentication on the initial screen is pressed.

When the favorite access button 2905 is pressed, the display is changed to a web browser screen 1000 shown in FIG. 11. That is, the Web content of the URL associated with the favorite access button 2905 is displayed.

The Web browser screen 1000 shown in FIG. 11 is formed by a title displaying area 1001, a Web content-displaying area 1002, and a setting item-displaying area 1003.

The title displaying area 1001 is an area for displaying a character string of a title indicative of a Web content displayed on the Web content-displaying area 1002.

The Web content-displaying area 1002 is an area for displaying a Web page which shows an acquired Web content associated with a specified URL. The Web content is described using e.g. HTML (Hyper Text Markup Language). A process for interpreting the HTML, and displaying the Web page based on the interpretation result is the same as that executed by a general Web browser, and hence detailed description thereof is omitted. Note that the URL specified when a favorite access button is pressed is a URL address stored in the pressed favorite access button in a manner associated therewith. Further, when the Web browser button 2903 shown in FIG. 10 is pressed to thereby switch the display to the Web browser screen, a content of a predetermined initial access page of the Web browser is displayed on the Web content-displaying area 1002.

The setting item-displaying area 1003 is an area for displaying setting items related to the Web browser, in which buttons indicative of the setting items 1004 to 1013 are displayed. These buttons will be described in the following.

Reference numeral 1004 denotes a backward button. By pressing this button, it is possible to display Web contents which have been displayed on the Web content-displaying area 1002 in a manner tracing back the history of display of the Web browser.

Reference numeral 1005 denotes a forward button. By pressing this button, it is possible to display the Web contents again in the order of display, such that the operation by the backward button 1004 is undone.

Reference numeral 1006 denotes a stop button. By pressing this button, when a Web content is being read from a Web server (e.g. the resource server 210), it is possible to stop reading of the Web content.

Reference numeral 1007 denotes a refresh button. By pressing this button, it is possible to acquire a Web content of a page being currently displayed on the Web content-displaying area 1002 from the Web server again, and display the same.

Reference numeral 1008 denotes a home button. One predetermined URL has been registered in the external memory 303 of the image forming apparatus 300 as a home address. By pressing the home button, it is possible to display a Web content of the home address on the Web content-displaying area 1002 by one-touch operation.

Reference numeral 1009 denotes a print button. By pressing this button, it is possible to display a print instruction screen for printing a Web content being currently displayed on the Web content-displaying area 1002.

Reference numeral 1010 denotes a favorite button. By pressing this button, a screen for selecting a URL desired by the user, out of URLs (access destination) of the favorite list stored in the external memory 303, is displayed. By selecting one URL on this screen, it is possible to acquire the Web content of the selected URL and display the acquired Web content on the Web content-displaying area 1002. Note that the URLs displayed when the favorite button 1010 is pressed are usually only URLs of the favorite list, and URLs of a temporary favorite list, referred to hereinafter, are not displayed (hidden).

Reference numeral 1011 denotes a menu button. When this button is pressed, a screen for making various settings related to the Web browser (settings associated with display, printing, and operations) is displayed.

Reference numeral 1012 denotes a URL input/display button (hereinafter referred to as the "URL button"). A URL indicating a storage destination of a Web content of a currently displayed Web page on the Web content-displaying area 1002 is displayed on this button. In FIG. 11, the URL of http://127.0.0.1/send/ID.html is displayed.

When a user depresses the URL button 1012, a soft keyboard screen (not shown) for manually inputting a URL is displayed. In this state, when the user inputs a desired URL, the input address is displayed on the URL button, and it is possible to display the Web content on the Web content-displaying area 1002 as a Web page.

Reference numeral 1013 denotes a URL input history-displaying button. When this button is pressed, a screen for designating one of URLs input by the user in the past is displayed (not shown). It is possible to designate a URL input in the past on this screen.

Next, a process for displaying the initial screen 2900 on the console section 311 will be described with reference to FIG. 12.

Figure 12:
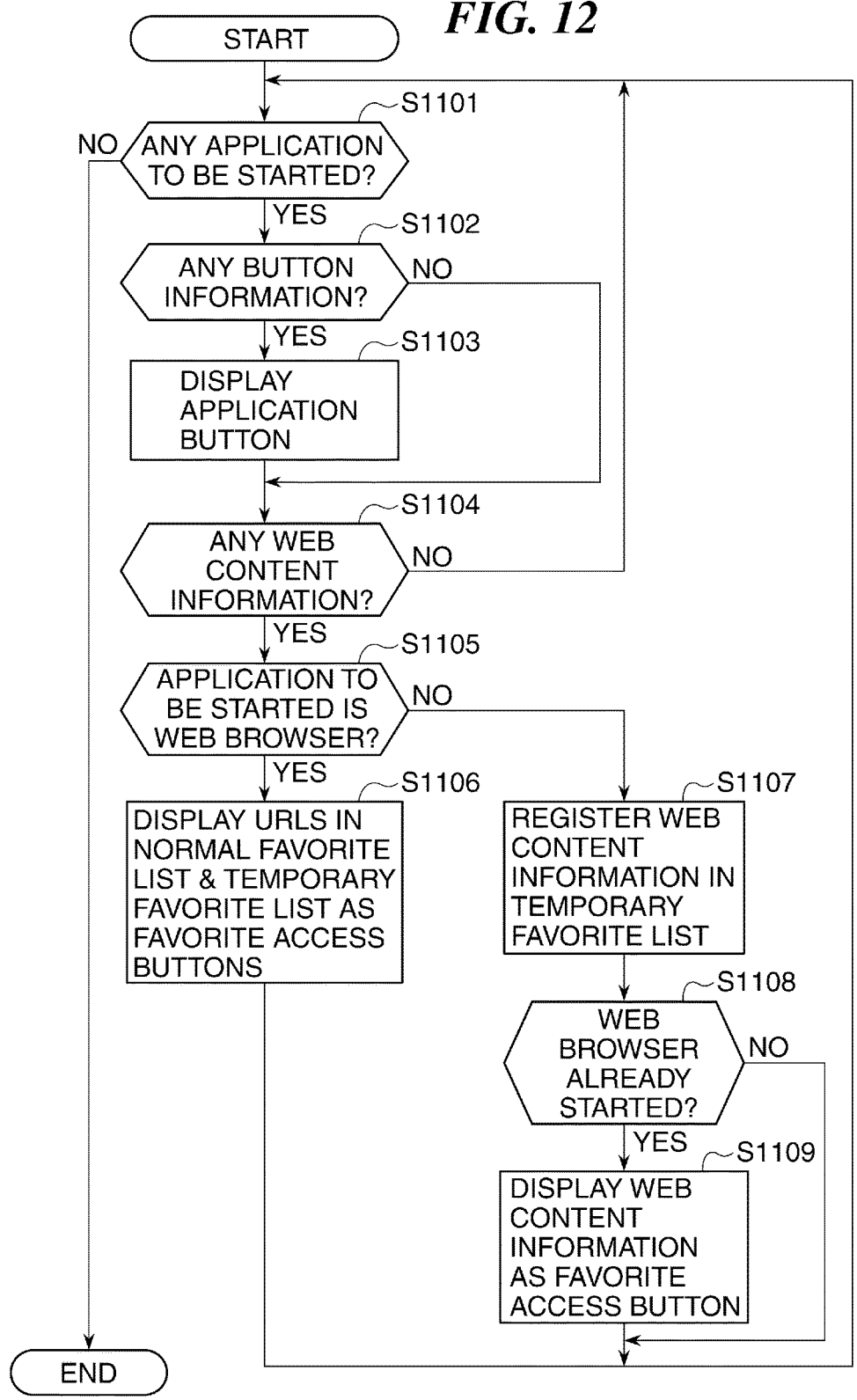
FIG. 12 is a flowchart of a process for displaying the initial screen.

FIG. 12 is a flowchart of the process for displaying the initial screen 2900 on the console section 311.

When the power of the image forming apparatus 300 is switched on, the CPU 301 reads a program stored in the external memory 303, and executes steps S1101 to 1109 as startup processing.

First, the CPU 301 refers to a starting application table stored in the external memory 303 to determine whether or not an application to be started exists (step S1101). The starting application table is, as shown in FIGS. 13A and 13B, a table storing names of applications which can be started in the image forming apparatus 300, button information to be displayed on the initial screen 2900 by each of the applications, and Web content information designated by each of the applications, in association with each other. The button information is formed by a character string and image information, which are displayed on a button on the initial screen 2900. The Web content information is information that an application displays on a favorite access button appearing on the initial screen 2900. The Web content information is formed by a URL of the Web content, a character string and image information, which are displayed on the favorite access button on the initial screen 2900. For example, in the case of the send application shown in FIG. 13A, the send button 2902 is displayed on the initial screen 2900 shown in FIG. 10 based on the button information, and the favorite access button (send authentication) 2905 displayed on the same based on the Web content information.

For example, when the user presses the favorite access button (send authentication) 2905 on the initial screen 2900, the Web content of "http://127.0.0.1/send/ID.html" is displayed on the Web content-displaying area 1002 appearing in FIG. 11. Further, when each button or each favorite access button is pressed, the character string of associated button information or associated Web content information is displayed on the title displaying area 1001 appearing in FIG. 11. Further, the image of the button information or the Web content information plays the same role as an image of a Favicon which is a general favorite icon.

If it is determined in the step S1101 that an application to be started exists (YES to the step S1101), the CPU 301 refers to the starting application table to determine whether or not the button information associated with the application exists (step S1102). If it is determined that the button information exists, the CPU 301 acquires the button information associated with the application from the starting application table, displays the button on the initial screen 2900 based on the acquired button information (step S1103), and proceeds to a step S1104. On the other hand, if it is determined that no button information exists, the CPU 301 directly proceeds to the step S1104. Note that a process for displaying the button on the initial screen 2900 based on the information acquired from the starting application table is the same as a general process, and hence detailed description thereof is omitted.

In the step S1104, the CPU 301 refers to the starting application table to determine whether or not the Web content information associated with the application exists. If it is determined that no Web content information exists, the process returns to the step S1101. On the other hand, if it is determined that the Web content information exists, the process proceeds to a step S1105.

In the step S1105, the CPU 301 determines, based on the starting application table (an example of an application determination unit), whether or not the application to be started is the Web browser 900. This determination is performed because the Web content information of the Web browser indicates the favorite list, and a process to be executed here is different from a process for temporary favorites formed by Web contents of applications other than the Web browser. Hereinafter, the favorite list held by the Web browser is referred to as the normal favorite list (first favorite information).

First, a process executed when the application to be started is not the Web browser (NO to the step S1105) will be described.

The CPU 301 refers to the starting application table, and registers the Web content information of the application to be started in a temporary favorite list (second favorite information) (step S1107). Here, the temporary favorite list will be described.

The temporary favorite list has the same information (URLs, character strings, and image information) as the favorites registered in the normal favorite list. However, the temporary favorite list is a favorite list stored in the RAM 308, and is deleted when the power of the image forming apparatus 300 is switched off. For this reason, in the initial state of the image forming apparatus 300 after the power has been switched on, the temporary favorite list has nothing registered therein. Further, the temporary favorite list is not displayed by pressing the favorite button 1010 on the Web browser screen (when the favorite button 1010 is pressed, only normal favorite list is displayed).

After execution of the step S1107, the CPU 301 checks whether or not the Web browser 900 has already been started (step S1108). If the Web browser 900 has already been started, the CPU 301 displays the favorite access button on the initial screen 2900 based on the Web content information of this application in the starting application table (step S1109). On the other hand, if the Web browser 900 has not been started, the process returns to the step S1101. Note that the display processing in the step S1109 is not executed in a case where the Web browser 900 has not been started because when the Web browser 900 is started, the temporary favorite list is displayed together (step S1106).

Next, the process executed when the application to be started is the Web browser (YES to the step S1105) will be described.

The CPU 301 displays the respective URLs in the normal favorite list stored in the external memory 303 and the temporary favorite list stored in the RAM 308 on the initial screen 2900 as the favorite access buttons (step S1106). Then, the process returns to the step S1101. The CPU 301 refers to the starting application table again, and if an application which has not been started exists, the steps S1102 to S1109 are repeated. Then, if no application which has not been started exists (NO to the step S1101), the CPU 301 terminates the present process. Note that in the case of the starting application table shown in FIG. 13A, by executing the process for starting these applications, the initial screen 2900 is displayed.

As described above, by registering Web content information of the respective applications in the temporary favorite list and displaying the Web content information at the start of the applications, it is possible to access the Web contents without the user's manual input. This makes it possible to save the user time and effort in inputting URLs, and prevent incorrect input.

Next, a process executed when the power of the image forming apparatus 300 is switched off will be described.

Figure 14:
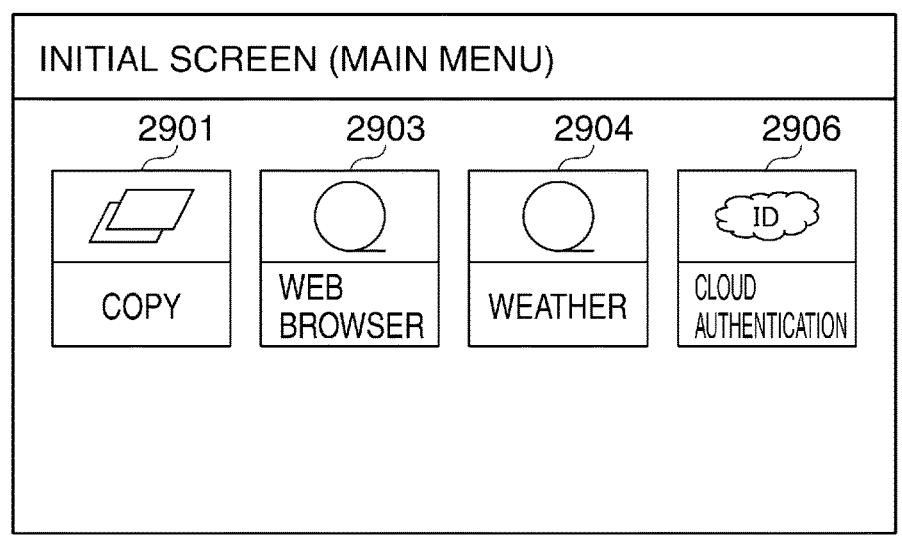
FIG. 14 is a diagram of an example of the initial screen displayed when the send application has been deleted or stopped.

When the power-off of the image forming apparatus 300 is detected, the CPU 301 checks whether or not the temporary favorite list stored in the RAM 308 exists, and if the temporary favorite list exists, the CPU 301 deletes this list. For example, in the case of the starting application table shown in FIG. 13A, the Web content information of the send application and the Web browser 900 have been registered in the temporary favorite list by the startup process shown in FIG. 12. If the send application is deleted or stopped in this state, the startup application table is changed to the one shown in FIG. 13B. In this state, the power of the image forming apparatus 300 is switched off, and then when the power of the image forming apparatus 300 is switched on next, the initial screen shown in FIG. 14 is displayed on the console section 311 by the startup process shown in FIG. 12. A comparison between FIGS. 14 and 10 shows that the send button 2902 and the favorite access button (send authentication) 2905 corresponding to the send application are not displayed in FIG. 14.

As described above, by deleting the temporary favorite list when the power of the image forming apparatus 300 is switched off, when the power of the image forming apparatus 300 is switched on next, a favorite access button which cannot be accessed is not displayed on the initial screen. This makes it possible to improve the user-friendliness.

Although in the starting application table shown in FIGS. 13A and 13B, only the button information and the Web content information are included, other information may be included.

In the above-described embodiment, by referring to the starting application table, the Web content information associated with the applications other than the Web browser is all registered in the temporary favorite list. However, Web contents which can be always accessed may be registered not in the temporary favorite list, but in the normal favorite list.

In a variation of the embodiment, described hereafter, a description will be given of a case where the Web content information associated with the applications other than the Web browser is registered in the normal favorite information on condition that a specific condition is satisfied, with reference to FIG. 15. Note that the basic processing and control are the same as described in the embodiment, and hence the description will be given mainly of the different points.

FIG. 15 is a flowchart of a process for displaying the initial screen according to a variation of the embodiment.

Referring to FIG. 15, if it is determined in the step S1105 that the application to be started is not the Web browser 900, determination of whether or not the Web content information associated with the application to be started is a Web content which can be always accessed is performed (steps S1401 to S1404). This determination process will be described.

In the step S1401, the CPU 301 refers to the starting application table stored in the external memory 303. Then, the CPU 301 determines whether or not the URL in the Web content information of the application to be started is similar to any of the URLs on the normal favorite list stored in the external memory 303 (step S1401). For example, if the URL in the Web content information of the application to be started matches a URL in the normal favorite list match or has the same host name as the URL in the normal favorite list, it is determined that the URL is similar to the URL in the normal favorite list.

If it is determined in the step S1401 that the URL is not similar to any one of the URLs in the normal favorite list, the CPU 301 executes the steps 1107 to S1109, similarly to the above-described embodiment. On the other hand, if it is determined in the step S1401 that the URL is similar to one of the URLs in the normal favorite list, the CPU 301 registers this Web content information in the normal favorite list (step S1402). After that, the CPU 301 checks whether or not the Web browser 900 has already been started, similarly to the above-described embodiment (step S1403). If it is determined in the step S1403 that the Web browser 900 has already been started, similarly to the above-described embodiment, the CPU 301 displays the Web content information of this application added to the normal favorite list on the initial screen as a favorite access button (step S1404). On the other hand, if the Web browser 900 has not been started, similarly to the above-described embodiment, the CPU 301 terminates the process for starting this application without performing any processing (returns to the step S1101).

As described above, when a URL in the Web content information of an application to be started is similar to any of the URLs registered in the normal favorite list, the Web content of this URL is determined as a Web content which can be always accessed, and can be registered in the normal favorite list. This saves the user time and effort in manually registering the favorites in the normal favorite list, which improves the user-friendliness.

Although in the above-described variation, a URL is used in the similarity determination in the step S1401 in FIG. 15, any other suitable determination method may be employed. For example, the similarity determination can be performed using information other than URLs, such as character strings and image information registered in the starting application table.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-156645 filed Jul. 29, 2013, which is hereby incorporated by reference herein in its entirety.

What is claimed is:

1. An image forming apparatus comprising:
    a request unit configured to request a server to perform registration of the image forming apparatus;
    a determination unit configured to determine whether or not processing related to the registration of the image forming apparatus is successful; and
    a control unit configured to control to display a button for accessing the server if it is determined by the determination unit that the processing related to the registration of the image forming apparatus is successful, and prevent the button from being displayed if it is determined by the determination unit that the processing related to the registration of the image forming apparatus is not successful,
    wherein if the button receives an instruction, accessing the server by a browser is performed if the button accepts an instruction, user authentication is performed by the server through the browser, and a token associated with the user authentication is stored, and
    wherein the request unit, determination unit, and control unit are implemented by a processor and a memory.

2. The image forming apparatus according to claim 1, wherein the control unit controls to perform the accessing to the server by the browser if the button accepts the instruction.

3. The image forming apparatus according to claim 1, further comprising an acquiring unit configured to acquire a password from the server,
    wherein the determination unit determines whether or not the password acquired by the acquiring unit exists, and
    wherein the control unit controls to display the button if it is determined by the determination unit that the password exists, and not to display the button if it is determined by the determination unit that the password does not exist.

4. The image forming apparatus according to claim 1, wherein the control unit controls to display the button together with a copy button for using a copy function.

5. A method of registering an image forming apparatus, the method comprising:
    requesting a server to perform registration of the image forming apparatus;

determining whether or not processing related to the registration of the image forming apparatus is successful; and displaying a button for accessing the server if it is determined that the processing related to the registration of the image forming apparatus is successful, and preventing the button from being displayed if it is determined that the processing related to the registration of the image forming apparatus is not successful, wherein if the button receives an instruction, the server is accessed by a browser if the button accepts an instruction, user authentication is performed by the server through the browser, and a token associated with the user authentication is stored.

6. The method according to claim 5, wherein accessing the server by the browser is controlled if the button accepts the instruction.

7. The method according to claim 5, further comprising:
acquiring a password from the server;
determining whether or not the acquired password exists; and
displaying the button if it is determined that the password exists, and not displaying the button if it is determined that the password does not exist.

8. The method according to claim 5, wherein the button is displayed together with a copy button for using a copy function.

9. A non-transitory computer-readable storage medium storing a program including instructions which, when executed by a processor, causes a computer to:

request a server to perform registration of an image forming apparatus;

determine whether or not processing related to the registration of the image forming apparatus is successful; and display a button for accessing the server if it is determined that the processing related to the registration of the image forming apparatus is successful, and prevent the button from being displayed if it is determined that the processing related to the registration of the image forming apparatus is not successful, wherein if the button receives an instruction, the server is accessed by a browser if the button accepts an instruction, user authentication is performed by the server through the browser, and a token associated with the user authentication is stored.

* * * * *